US006822573B2

(12) United States Patent
Basir et al.

(10) Patent No.: US 6,822,573 B2
(45) Date of Patent: Nov. 23, 2004

(54) DROWSINESS DETECTION SYSTEM

(75) Inventors: Otman Adam Basir, Waterloo (CA); Jean Pierre Bhavnani, Waterdown (CA); Fakhreddine Karray, Waterloo (CA); Kristopher Desrochers, Kitchener (CA)

(73) Assignee: Intelligent Mechatronic Systems Inc., Ontario (CA)

( * ) Notice: Subject to any disclaimer, the term of this patent is extended or adjusted under 35 U.S.C. 154(b) by 0 days.

(21) Appl. No.: 10/348,037

(22) Filed: Jan. 21, 2003

(65) Prior Publication Data

US 2003/0151516 A1 Aug. 14, 2003

Related U.S. Application Data

(60) Provisional application No. 60/349,832, filed on Jan. 18, 2002.

(51) Int. Cl.[7] .......................... G08B 23/00; B60R 21/32

(52) U.S. Cl. ................. 340/575; 340/573.1; 340/573.7; 340/576; 128/666; 128/687; 128/702; 280/735

(58) Field of Search ............................. 340/573.1, 575, 340/576, 573.7; 128/702, 687, 666; 351/205; 280/735

(56) References Cited

U.S. PATENT DOCUMENTS

| | | | |
|---|---|---|---|
| 3,947,815 | A | 3/1976 | Muncheryan |
| 4,706,072 | A | 11/1987 | Ikeyama |
| 4,836,219 | A | 6/1989 | Hobson et al. |
| 5,583,590 | A | 12/1996 | Clupper |
| 5,691,693 | A | 11/1997 | Kithil |
| 5,844,486 | A | 12/1998 | Kithil et al. |
| 5,846,206 | A | 12/1998 | Bader |
| 5,907,282 | A | 5/1999 | Tuorto et al. |
| 6,014,602 | A | 1/2000 | Kithil et al. |
| 6,060,989 | A | 5/2000 | Gehlot |
| 6,091,334 | A | 7/2000 | Galiana et al. |
| 6,104,296 | A | 8/2000 | Yasushi et al. |
| 6,147,612 | A | 11/2000 | Ruan et al. |
| 6,275,146 | B1 | 8/2001 | Kithil et al. |

*Primary Examiner*—Jeffrey Hofsass
*Assistant Examiner*—Lam Pham
(74) *Attorney, Agent, or Firm*—Carlson, Gaskey & Olds, P.C.

(57) ABSTRACT

This invention describes a non-intrusive system used to determine if the driver of a vehicle is drowsy and at risk of falling asleep at the wheel due to drowsiness. The system consists of two different drowsiness detection systems and a control unit. This redundancy reduces the risk of a false drowsiness assessment. The first subsystem consists of an array of sensors, mounted in the vehicle headliner and seat, which detects head movements that are indicative characteristics of a drowsy driver. The second subsystem consists of heart rate monitoring sensors placed in the steering wheel. The control unit is used to analyze the sensory data and determine the driver's drowsiness state and therefore corresponding risk of falling asleep while driving. Through sensory fusion, intelligent software algorithms, and the data provided by the sensors, the system monitors driver characteristics that may indicate a drowsy driver. If the driver is found to be drowsy, a signal is outputted which may be used to activate a response system. This system is not limited to automobiles; this system may be used in any type of vehicle, including aircrafts, trains and boats.

7 Claims, 2 Drawing Sheets

DROWSINESS DETECTION SYSTEM

This application claims priority to U.S. Provisional Ser. No. 60/349,832, filed Jan. 18, 2002.

BACKGROUND OF THE INVENTION

This invention relates to a system for determining a drowsy driver.

Each year numerous automotive accidents and fatalities occur as a result of sleepy individuals falling asleep while driving. It has been observed that these drivers exhibit certain physiological patterns that are predictable and detectible. The classic "head bobbing" motion, where the driver's head drops and then quickly pulls back upward is one of the patterns that is often exhibited when an individual is becoming drowsy while seated in an upright position. Additionally, a drop in heart rate may also indicate the presence of a drowsy driver.

Several known drowsiness detection systems use CCD cameras or other optical sensors to detect an image of the driver's face in order to analyze eyelid movements for signs of drowsiness. Optical sensors may become covered or blocked by dirt and debris and therefore lose their ability to function effectively. Further more, they may be ineffective when the driver is wearing eyeglasses or sunglasses.

Other systems attempt to monitor the driver's heart rate using devices and apparatuses that must be fastened to the driver's body. These include wrist straps, collars, headbands, glasses, and other devices. These systems may cause discomfort and may be bothersome to the driver, and therefore may place the driver at increased risk. Additionally, there is no guarantee that the driver will wear any of these devices. These systems are only effective in cases where the driver chooses to wear the device.

Furthermore, some systems attempt to detect a drowsy driver by monitoring only the steering patterns of the driver. In certain situations, these systems may incorrectly determine the driver's drowsiness level. For example, new drivers often exhibit erratic steering patterns while learning how to drive. Also, drivers of off-road vehicles may also display abnormal and erratic steering patterns while trying to navigate rough terrain. A drowsiness detection system based solely on steering patterns may falsely identify these drivers as drowsy.

It is therefore desirable to provide an effective system capable of determining the driver's risk of falling asleep by monitoring multiple signs of drowsiness in a redundant, reliable and non-intrusive manner that is transparent to the driver.

SUMMARY OF THE INVENTION

The drowsiness detection system includes two drowsiness detection subsystems communicating with a control unit. Using sensory fusion, intelligent fuzzy algorithms, and the sensory data, the control unit determines the drowsiness state of the driver. The system non-intrusively monitors multiple characteristics of the driver which introduces redundancy and increases the confidence level of the system's drowsiness determination.

The first subsystem monitors the driver's heart rate using sensors placed in the steering wheel of the vehicle. The second subsystem involves the use of an array of sensors mounted in the vehicle headliner and seat, used to detect the position of the driver's head. The sensory data from the two subsystems is communicated to the control unit and monitored for drowsiness indicators over a period of time. Other sensors may be used alternatively or in addition to these sensors.

The control unit collects data from the entire sensory suite and improves this data using sensory fusion techniques. The control unit then uses intelligent fuzzy algorithms based on drowsiness threshold levels and patterns to make a drowsiness determination. If the driver is found to be drowsy, a signal is outputted from the control unit.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
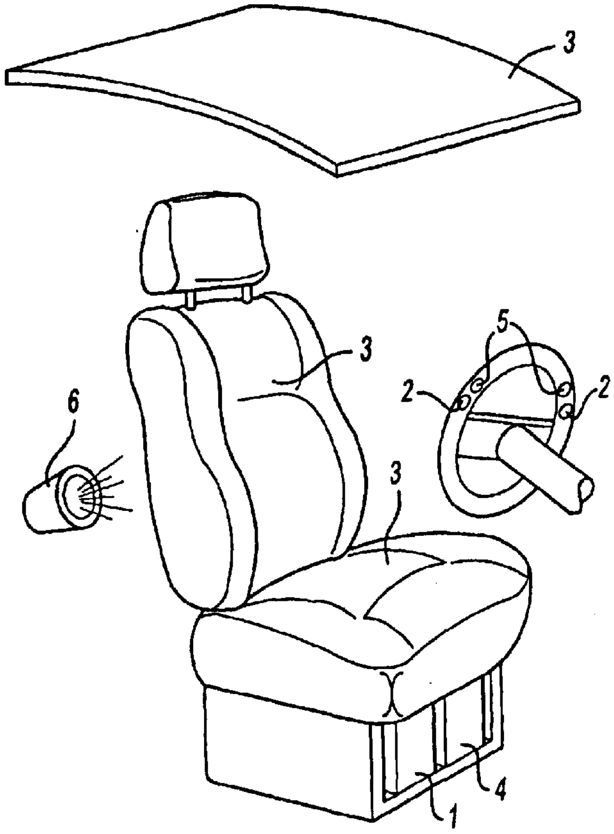
FIG. 1 shows the interior view of an automobile with a possible configuration of the invention.
Figure 2:
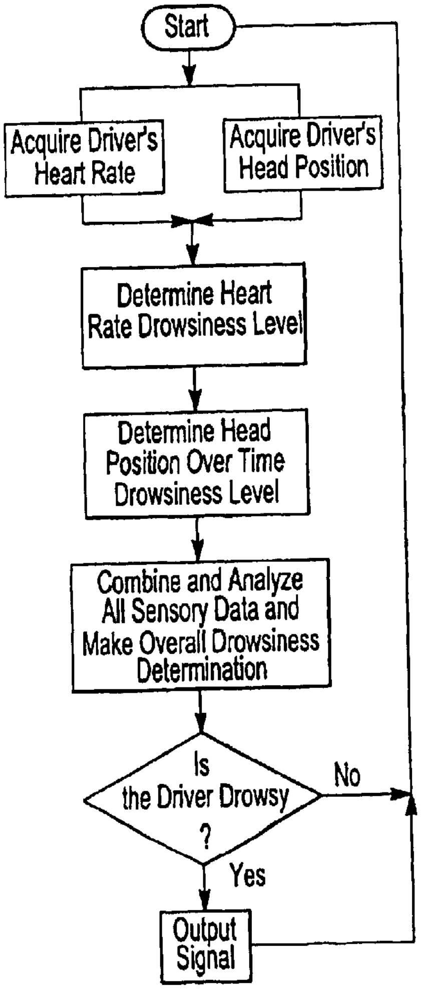
FIG. 2 shows a flow chart of the overall drowsiness detection system.
Figure 3:
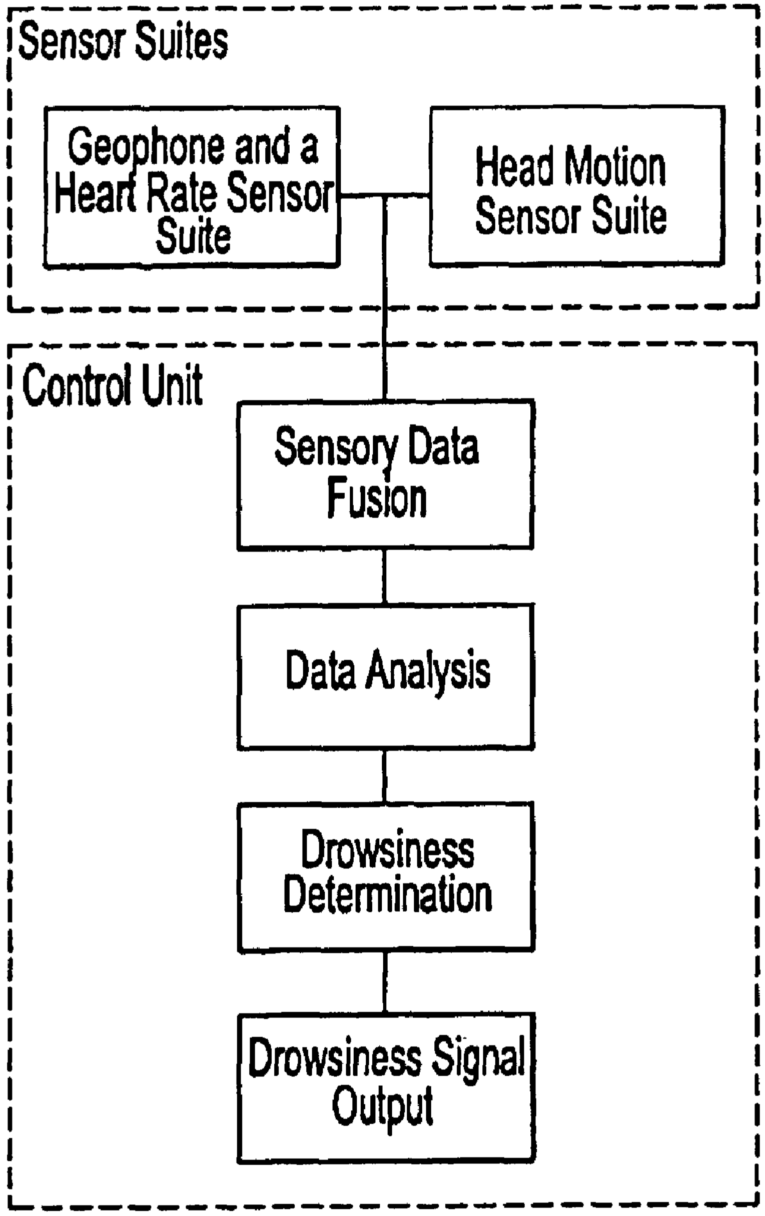
FIG. 3 shows a block diagram of the logical components of the invention.

FIG. 1 illustrates a possible configuration of the drowsiness detection system. The system includes a control unit (1) communicating with a sensor suite (2) in the steering wheel, and a second sensor suite (3) in the vehicle seat and headliner.

The control unit (1) includes a CPU and memory and is suitably programmed to perform the functions described herein. The control unit (1) uses fuzzy logic algorithms to determine specific head motion patterns that may indicate a drowsy driver, detect a heart rate indicative of a drowsy driver, and combine and analyze these results collectively to determine if the driver is drowsy and therefore at risk of falling asleep while driving.

The first sensor suite (2) consists of heart rate sensors placed in the steering wheel. These sensors capture the driver's heart rate and this data is communicated to the control unit (1) for analysis.

The second sensor suite (3), mounted in the seat and headliner, contains an array of sensors to monitor the driver's head position. These sensors communicate the head position to the control unit for analysis with the other data. These sensors are generally capacitive sensors which determine the position of the occupant's head over time and are described in detail in copending application U.S. Ser. No. 09/872,873, filed Jun. 1, 2001, commonly assigned, which is hereby incorporated by reference.

The control unit (1) detects a drowsy driver by analyzing the heart rate and comparing this data to established threshold values. The control unit may also use algorithms to eliminate other detected heartbeats to ensure only the driver's heart rate is being analyzed. Additionally the control unit (1) monitors the driver's head motion and compares this to established patterns indicative of a drowsy driver. Finally, the control unit (1) makes an overall assessment regarding the driver's drowsiness by using an intelligent fuzzy logic software algorithm that makes use of the resulting information from the sensory fusion techniques applied to the raw sensor data. (2) (3). If the driver is found to be drowsy, a signal is outputted which may be used to activate a response system, such as an audible alert over speaker (6).

Parameters that are used for the control unit's (1) software include the driver's head position over a period of time, and heart rate. Additionally, the control unit requires data to match head motion patterns indicative of a drowsy driver and drowsiness threshold values for the heart rate.

The system may optionally include a geophone (4) in the vehicle seat for determining heart rate and/or breathing rate. The system may also optionally include oxygen-saturation level sensors (5) embedded in the steering wheel. The optional third sensor suite (4), mounted in the vehicle seat is a geophone (4) similar to those used to detect earthquakes. The geophone (4) communicates heart rate and/or breathing rate to the control unit (1). The optional fourth sensor suite (5) is the oxygen-saturation sensors (5) mounted in the steering wheel. The sensors (5) measure the oxygen level in the driver to determine an alertness or drowsiness level. The oxygen level is communicated to the control unit (1) for analysis.

If the geophone (4) and/or oxygen saturation sensors (5) are also or alternatively used, the control unit (1) also uses fuzzy logic to determine a drowsiness level for each of these sensors and then combine and analyze all of the results collectively to determine if the driver is drowsy. If the optional sensors (4) and (5) are additionally or alternatively used, the control unit (1) detects a drowsy driver by analyzing the heart rate and/or breathing rate and the oxygen level in the driver to determine a drowsiness level based upon each type of information. The control unit (1) then combines and analyzes all of the information to determine the drowsiness of the driver.

The particular algorithm for determining drowsiness is set forth in more detail below.

Let the sensor suite be indexed by the set $A=\{S_1, S_2, \ldots, S_N\}$, gathering information about the drowsiness state of the occupant. Each sensor $S_i$ observes a modality $\theta_i$ that is relevant to the assessment over a universal of information space given by $\Theta$. An information structure $\eta_i$ is used to relate $\theta_i$ to a belief $z_i$. Thus, $$z_i=\eta_i(\theta_i) \tag{1}$$

where $z_i \in \Im$, the knowledge space.

$S_i$ chooses a decision $\gamma$ from a set of possible decisions $\Gamma_i=(\gamma_1=\text{drowsy}, \gamma_2=\text{not drowsy}, \gamma_M=\text{un determined})$. This decision is related to $z_i$ by a decision function $\delta_i$ as $$\gamma=\delta_i(z_i) \tag{2}$$

Each sensor processes its own beliefs, which might be different from the beliefs of other sensors, and uses them to choose a valid decision. Collectively, the n-tuple pair $\eta=(\eta_1, \ldots, \eta_n)$, and $\delta=(\delta_1, \ldots, \delta_n)$, respectively, are the information structure and the decision rule of the suite.

A ranking function that places a preference ordering on the answers of each sensor is defined as $R_i(\delta_i(z_i), q)$: $\Gamma\times\Theta\rightarrow\Re$ for each $S_i \in A$, and $$\sum_{j=1}^{N} w_{ij} = 1, \ \forall\, i, j \le N.$$

A global ranking function $R_G$, i.e., the suite ranking function, is then defined to aggregate the expected rankings of all members, $R_G=f(R_1, \ldots, R_n)$. The performance of the sensors as a group is influenced by this function.

Team Consensus for Fusion

Here each individual sensor must first assess its own expected rankings $R^*_i(\gamma_k)$, $\forall\gamma_k \in \Gamma_i$. Then it revises its own by making an assessment of each other sensor's relative importance, expertise, honesty, etc. Specifically, each revised expected ranking is deemed to be of the form $$R_i^*(\gamma_k) = \sum_{j=1}^{N} w_{ij} \times R_j(\gamma_k) \tag{3}$$

where $w_{ij}$ is a positive importance weight assigned by the $i^{th}$ sensor to the $j^{th}$ sensor and $$\sum_{k \in \Gamma_i} R_i(\gamma_k) = 1.$$

The process continues until further revision no longer changes the expected ranking of any sensor. Since w is an N×N stochastic matrix, it can be viewed as the one-step transition probability matrix of a Markovian chain with N states and stationary transition probability. This interpretation enables one to use the limit theorems of Markovian chains to determine whether the group will converge to a common ranking, which represents the group consensus, and if so what is the value of this ranking. Consensus will be reached if and only if there exists a vector $\pi$ such that.

$$\pi \times w=\pi \tag{4}$$

$$\text{subject to } \sum_{i \in A} \pi_i = 1 \tag{5}$$

And the common group ranking, for each $\gamma_k \in \Gamma$ denoted by $R_G(\gamma_k)$, k=1, . . . , M, is given by $$R_G(\gamma_k) \sum_{i=1}^{N} \pi_i \times R_i(\gamma_k) \tag{6}$$

Uncertainty Estimation

Now the objective is to seek a function, by processing the decisions made by a group of the sensors, it can estimate their uncertainties.

There are two types of uncertainties that can be used to model this estimation process: the self-uncertainty and the conditional-uncertainty. The self-uncertainty measures how uncertain the sensor about its decisions or how random are the choices of the agent. The more certain is sensor the higher contrast are its choices. Let $U_{i|i}$ indicate the self-uncertainty of $S_i$. $U_{i|i}$ is computed based on the local knowledge of the sensor as $$U_{i\backslash i} = -\sum_{k=1}^{M} R_i(\gamma_k)\log_M R_i(\gamma_k) \tag{7}$$

The conditional-uncertainty, however, is a measure of the state of uncertainty of a sensor given the decisions of other agents. This measure can be used to capture the essence of knowledge relevancy between agents.

$$U_{i\backslash j} = -\sum_{k=1}^{M} R_i(\gamma_k \mid \Gamma_j)\log_M R_i(\gamma_k \mid \Gamma_j) \tag{8}$$

In general, for a team of N agents, these uncertainties are arranged in a matrix form as $$U = \begin{bmatrix} U_{1|1} & U_{2|1} & \cdots & U_{N|1} \\ U_{1|2} & U_{2|2} & \cdots & U_{N|2} \\ \cdots & \cdots & \cdots & \cdots \\ U_{1|N} & U_{2|N} & \cdots & U_{N|N} \end{bmatrix} \tag{9}$$

Uncertainty Based Weightings

Now, given the uncertainty matrix U, each sensor of the group can determine appropriate weights for itself and other agents. This can be achieved by minimizing the sum of squares of its self-uncertainty and conditional uncertainties associated with other agents. This implies that each sensor will assign high weights to agents with low conditional-uncertainties and low weights to those with high conditional-uncertainties. The minimization problem may be stated as follows:

$$\text{Minimize } T_i = \sum_{j \in A} w_{ij}^2 \times U_{j|i}^2, \tag{10}$$

$$\text{subject to } \sum_{j=1}^{N} w_{ij} = 1, \text{ and } w_{ij} \geq 0 \tag{11}$$

The above minimization problem subject to the above constraints is equivalent to minimization of $$V_i = \sum_{j \in A} w_{ij}^2 \times U_{j|i}^2 - \rho \left[ \sum_{j \in A} w_{ij} - 1 \right] \tag{12}$$

where ρ is the Lagrange multiplier. Taking the partial derivative of $V_i$ with respect to $w_{ij}$ and equating it to zero yields $$w_{ij} = \frac{\rho}{2 \times U_{j|i}^2} \tag{13}$$

Similarly, taking the partial derivative of $V_i$ with respect to the Lagrange multiplier ρ and equating with zero yields $$\sum_{j \in A} w_{ij} = 1 \tag{14}$$

Combining eqs. (13) and (14) yields $$\sum_{j \in A} \frac{\rho}{2 \times U_{j|i}^2} = 1 \tag{15}$$

It then follows that $$\rho = \frac{2}{\sum_{j \in A} U_{j|i}^{-2}} \tag{16}$$

Substituting eqs. (16) and (13) gives the sensor weighting coefficient, $w_{ij}$, as follows:

$$w_{ij} = \frac{1}{U_{j|i}^2 \sum_{k \in A} U_{k|i}^{-2}} \tag{17}$$

If we let $m_i^j$ be the fuzzy membership function of sensor $S_i$ on the possibility of a mode j(j=1: drowsy; j=2: not drowsy; j=3: undetermined) drowsy occupant. The aggregated drowsiness membership function is given by $$m_{aggregated}(\text{drowsiness}) = \sum_{S_i \in A} w_i m_i^j$$

Based upon this determination, the control unit (1) determines whether the driver is drowsy and, if so, activates some response, such as an audible alert to the driver over speaker (6).

What is claimed is:

1. A drowsiness detection system comprising:

A heart rate sensor for determining a heart rate of an occupant and generating a signal indicating the heart rate;

A position sensor for determining a head position of the occupant over time and generating a signal indicating the head position over time; and A control unit determining whether the occupant is drowsy based upon the heart rate and the head position over time.

2. The drowsiness detection system of claim 1 wherein the heart rate sensor is mounted in a vehicle steering wheel.

3. The drowsiness detection system of claim 2 wherein the position sensor comprises an array of sensors mounted adjacent a vehicle headliner.

4. The drowsiness detection system of claim 1 wherein the control unit uses fuzzy logic algorithms to determine specific head motion patterns that may indicate a drowsy occupant.

5. The drowsiness detection system of claim 4 wherein the control unit uses fuzzy logic algorithms to determine whether the heart rate is indicative of a drowsy occupant.

6. The drowsiness detection system of claim 5 wherein the control unit uses fuzzy logic algorithms to integrate and evaluate the heart rate and head position over time to determine whether the occupant is drowsy.

7. A method for determining a drowsy driver including the steps of:

a) determining a heart rate of the driver;

b) determining a head position over time of the driver; and c) determining whether the driver is drowsy based upon said steps a) and b).

* * * * *